United States Patent
Yu et al.

(10) Patent No.: US 8,464,243 B2
(45) Date of Patent: Jun. 11, 2013

(54) UPDATING CLIENT NODE OF COMPUTING SYSTEM

(75) Inventors: Jean X. Yu, Austin, TX (US); James J. Myers, Paradise, CA (US); Gergana V. Markova, Vail, AZ (US); Thu Nguyen, Tucson, AZ (US); David M. Cannon, Tucson, AZ (US); Kenneth E. Hannigan, Tucson, AZ (US); James P. Smith, Redwood City, CA (US); Colin S. Dawson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 12/545,724

(22) Filed: Aug. 21, 2009

(65) Prior Publication Data

US 2011/0047537 A1  Feb. 24, 2011

(51) Int. Cl.
*G06F 9/44* (2006.01)
*G06F 9/445* (2006.01)

(52) U.S. Cl.
USPC ........... 717/173; 717/168; 717/172; 717/174; 717/177; 717/178

(58) Field of Classification Search
None
See application file for complete search history.

(56) References Cited

U.S. PATENT DOCUMENTS

| | | | |
|---|---|---|---|
| 6,269,456 B1 | 7/2001 | Hodges et al. | |
| 6,711,557 B1 | 3/2004 | Palaniappan | |
| 6,973,647 B2 | 12/2005 | Crudele et al. | |
| 7,293,169 B1 | 11/2007 | Righi et al. | |
| 7,707,573 B1 * | 4/2010 | Marmaros et al. | 717/178 |
| 8,065,712 B1 * | 11/2011 | Cheng et al. | 726/1 |
| 2002/0156894 A1 | 10/2002 | Suorsa et al. | |
| 2003/0208569 A1 | 11/2003 | O'Brien et al. | |
| 2004/0002943 A1 * | 1/2004 | Merrill et al. | 707/1 |
| 2005/0210459 A1 * | 9/2005 | Henderson et al. | 717/168 |
| 2007/0233698 A1 | 10/2007 | Sundar et al. | |
| 2008/0109540 A1 | 5/2008 | Rogers et al. | |
| 2008/0172736 A1 | 7/2008 | Barr et al. | |
| 2009/0037904 A1 | 2/2009 | Cohen et al. | |
| 2009/0113416 A1 * | 4/2009 | Bealkowski et al. | 717/177 |

FOREIGN PATENT DOCUMENTS

| | | |
|---|---|---|
| WO | WO 03/023649 A1 | 3/2003 |
| WO | 2008124560 A1 | 10/2008 |

OTHER PUBLICATIONS

OldVersion, 2001, http://www.oldversion.com/about_us.php.*
International search report and written opinion in PCT counterpart application PCT/EP2010/062043, dated May 30, 2011.

* cited by examiner

*Primary Examiner* — Kris Rhu
(74) *Attorney, Agent, or Firm* — Feb R. Cabrasawan (57) ABSTRACT

During execution of an existing scheduling computer program on a client node, an update computer program and a self-describing automatic installation package are downloaded to the client node from a logical depot node implemented on an existing management server. Therefore, advantageously, no physical depot node or other additional computing device is needed for the client node to update itself. Execution of the update computer program is spawned on the client node from the existing scheduling computer program. As such, the update computer program inherits root access to the client node and security credentials to the management server from the scheduling computer program—advantageously, then, a user does not have to perform any laborious configuration of the client node in order to update the node. The client node ultimately updates itself using the self-describing automatic installation package, which includes all the information needed for the client node to update itself.

18 Claims, 5 Drawing Sheets

UPDATING CLIENT NODE OF COMPUTING SYSTEM

FIELD OF THE INVENTION

The present invention relates generally to a computing system that has a client node, such as a client computing device, and more particularly to updating the client node, such as updating the software running on the client node, including the operating system of the client node.

BACKGROUND

A common computing system architecture is the client-server model. In the client-server model, a computing system includes one or more server computing devices, and a number of client computing devices. Usually there are more client computing devices than server computing devices. The client computing devices may be heterogeneous. This means that the client computing devices may have different types of hardware, and/or may have different types of operating systems. For example, a computing system may include client computing devices running different versions of the same operating systems, as well as different operating systems. On occasion, the software running on the client computing devices, including their operating systems, may have to be updated to fix bugs or security vulnerabilities in the software, and/or to provide the computing devices with additional functionality.

SUMMARY

The present invention relates generally to updating a client node of a computing system. In at least some embodiments of the present invention, an update computer program and a self-describing automatic installation package are downloaded to the client node from a logical depot node implemented on an existing management server, during execution of an existing scheduling computer program on a client node. Both the client node and the existing management server are part of a computing system. Therefore, advantageously, no physical depot node or other computing device has to be added to the computing system for the client node to update itself. Execution of the update computer program is spawned on the client node from the existing scheduling computer program. As such, the update computer program inherits root access to the client node and security credentials to the management server from the scheduling computer program—advantageously, then, a user does not have to perform any laborious configuration of the client node in order to update the node. The client node ultimately updates itself using the self-describing automatic installation package, which includes all the information needed for the client node to update itself.

A method of one embodiment of the invention includes the following. During execution of an existing scheduling computer program on a client node of a computing system, an update computer program is downloaded from a management server of the computing system to the client node. Furthermore, a self-describing automatic installation package is downloaded to the client node from a logical depot node of the computing system implemented on the management server, such that no physical depot node is needed within the computing system for the client node to update itself. Execution of the update computer program on the client node is spawned from the existing scheduling computer program. As such, the update computer program inherits root access to the client node from the scheduling computer program, and the update computer program inherits security credentials to the management server from the client node. The client node is updated using the self-describing automatic installation package, where the self-describing automatic installation package includes all information needed for the client node to update itself.

A server computing device of an embodiment of the invention includes hardware, a logical depot node, and one or more computer programs. The logical depot node is implemented as software running on the hardware, such that no physical depot node separate from the logical depot node is needed within a computing system of which the server computing device is a part for a client node of the computing system to update itself. The computer programs copy a self-describing automatic installation package to the logical depot node, from a remote computing system that is separate from the computing system. The self-describing automatic installation package includes all information needed for the client node to update itself, and is created based on a remote node but is decoupled from the remote node. In response to an existing scheduling computer program on the client node being executed and submitting a request, the computer program transmits an update computer program and the self-describing automatic installation package to the client node. This results in the client node updating itself using the self-describing automatic installation package.

A computer program product of an embodiment of the invention includes a computer-readable medium having computer-readable program code embodied therein. The computer-readable program code includes computer-readable program code to copy all executable files and metadata needed for a client node to update itself to a filespace of a package development node. The package development node is part of a computing system configured to be similar to a customer target computing system of which the client node is a part and to which the computing system is remote, such that the package development node is similar to the client node. The computer-readable program code further includes computer-readable program code to create on the package development node a self-describing automatic installation package including all the executable files and the metadata. As such, at least the executable files and the metadata are decoupled from the package development node. The computer-readable program code also includes computer-readable program code to archive the executable files and the metadata within the self-describing automatic installation package to a filespace of a package development server of the computing system.

Still other embodiments, aspects, and advantages of the present invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In general, in at least some embodiments of the present invention, an update computer program and a self-describing automatic installation package are downloaded to the client node from a logical depot node implemented on an existing management server, during execution of an existing scheduling computer program on a client node. Both the client node and the existing management server are part of a computing system. Therefore, advantageously, no physical depot node or other computing device has to be added to the computing system for the client node to update itself. Execution of the update computer program is spawned on the client node from the existing scheduling computer program. As such, the update computer program inherits root access to the client node and security credentials to the management server from the scheduling computer program—advantageously, then, a user does not have to perform any laborious configuration of the client node in order to update the node. The client node ultimately updates itself using the self-describing automatic installation package, which includes all the information needed for the client node to update itself.

More specifically, as noted in the background section, client computing devices of computing systems typically have to be updated occasionally. Existing approaches to updating such a client computing device are disadvantageous. For instance in a push model, a server computing device may push update files to the client computing device for the client computing device to execute. The server computing device pushes the update files to the client computing device in that the server computing device unilaterally stores the update files on the client computing device, without the client computing device having requested the files.

This approach is disadvantageous, because it requires the server computing device to have root access to each client computing device that has to be updated. Root access to a computing device means having administrator-level access to the computing device, so that anything can be modified, stored, or run on the computing device. However, setting up a computing system so that the server computing device has root access to each client computing device is laborious, and further represents a security risk, insofar as an intruder who gains access to the server computing device would then have complete control over each client computing device.

Another approach to updating a client computing device is for an update computer program running on the client computing device to retrieve the necessary update files from the server computing device. This paradigm is a pull model, in that the client computing device can be considered as pulling the update files from the server computing device. For instance, the server computing device may send the update files to the client computing device in response to a particular request from the client computing device for the update files.

This approach is also disadvantageous, because it requires the update computer program running on each client computing device to have security credentials that permit the update computer program to connect to the server computing device to report the status of the update. Security credentials can include passwords, identifying information such as security tokens or certificates, and so on, that identify the update computer program and that otherwise permit the update computer program to connect to the server computing device. However, setting up a computing system so that the update computer program running on each client computing device has proper security credentials to the server computing device is also laborious.

A third approach to updating a client computing device is to add what can be referred to as a physical depot node to the computing system in question. A physical depot node is a separate physical machine within the computing system. The physical depot node is set up so that it runs similar hardware and a compatible version of the same operating system as the client computing device in question. Thus, typically the client computing device can replicate files to the physical depot node, and then retrieve these files back from the physical depot node to its own filespace. A filespace of a computing device within the prior art is a portion of logical or physical storage space, like hard disk drive space, apportioned to the computing device on which to store files and data. In this approach, then, the update files are stored on the physical depot node, and the client computing device retrieves the update files from the physical depot node.

Because the physical depot node has been set up so that the client computing device can replicate files to the physical depot node, the client computing device can retrieve the update files from the physical depot node as if it had initially replicated them to the physical depot node. The physical depot node does not require root access, or any other type of access, to the client computing device, since the client computing device is pulling the update files from the physical depot node.

However, this approach is also disadvantageous. For the physical depot node approach to work properly, a separate physical depot node has to be set up for each of a number of different types of client computing devices within the computing system. For example, there may have to be a different physical depot node for each unique operating system running on the client computing devices, or even for each version of each unique operating system running on the client computing devices. Adding these physical depot nodes to the computing system is also laborious. An end user has to acquire the physical depot nodes, configure them, and add them to the computing system.

Embodiments of the present invention overcome these disadvantages. During execution of an existing scheduling computer program on a client node of a computing system, which can be a client computing device, the client node downloads an update computer program from a management server of the computing system, which can be a server computing device. Thus, the management server does not require root access to the client node, because the client node is pulling the update computer program from the management server instead of the management server pushing the update computer program to the client node.

Furthermore, execution of the update computer program is spawned on the client node as part of the existing scheduling computer program. Therefore, the update computer program inherits root access to the client node and security credentials to the management server from the existing scheduling computer program of the client node. As such, root access to the client node does not have to be explicitly provided to the update computer program via configuration of the client node or the update computer program. Likewise, security credentials to the management server do not have to be explicitly provided to the update computer program via configuration of the client node, the update computer program, or the management server.

A self-describing automatic installation package is also downloaded to the client node, from a logical depot node of the computing system that is implemented on the management server. No physical depot node is needed within the computing system, because the management server instead implements a logical depot node.

The client node is updated using the self-describing automatic installation package. The update computer program is able to perform this updating because it has inherited the root access to the client node from the existing scheduling computer program. Furthermore, the self-describing automatic installation package includes all information needed for the client node to update itself. Thus, the package is a self-describing package because it is fully complete insofar as updating the client node is concerned. The package is an automatic installation package because the updates of the package are automatically installed on the client node.

Figure 1:
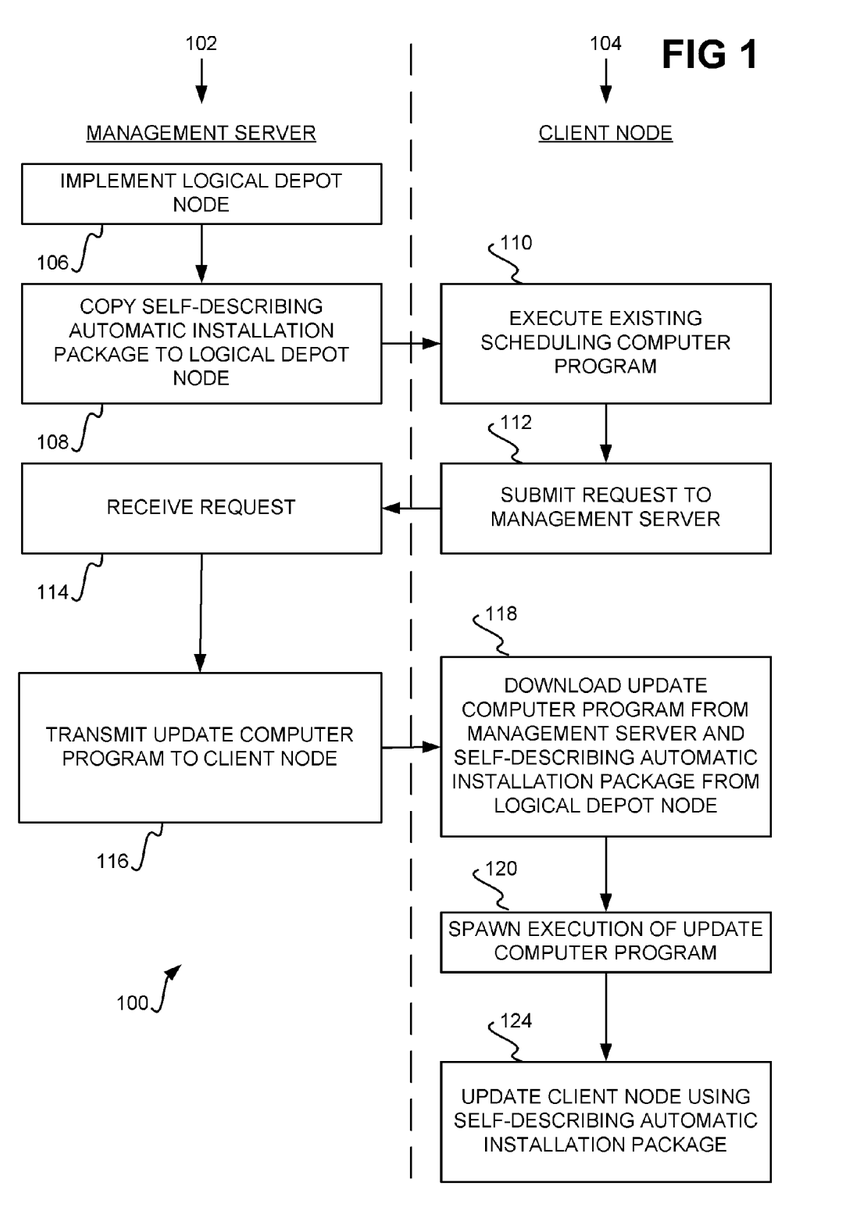
FIG. 1 is a flowchart of a method for updating a client node of a computing system, according to an embodiment of the present invention.

FIG. 1 shows a method 100 for updating a client node of a computing system, according to an embodiment of the invention. The method 100 is divided into two columns 102 and 104. The parts of the method 100 within the column 102 are performed by a management server, typically implemented in software of the computing system, whereas the parts of the method 100 within the column 104 are performed by the client node, such as a client computing device, of the computing system. The management software can run on the same physical computing device as the client node or on a different physical computing device as compared to the client node.

The management server implements a logical depot node of the computing system (106). The logical depot node is logical in the sense that it is not an actual physical node within the computing system. As such, it is noted that no physical depot node is present within the computing system. No physical depot node is needed within the computing system for the client node to update itself.

The management server copies a self-describing automatic installation package to the logical depot node from a remote system separate from the computing system of which the management server is a part (108). The self-describing automatic installation package includes all the information needed for the client node to update itself. As such, the self-describing automatic installation package includes all executable files and metadata needed for the client node to update itself, as well as all access rules governing access to the executable files and the metadata to permit the client node to access these files and metadata. Executable files are files that the client node actually executes, or runs, to update itself. The metadata may include the order in which these executable files are executed, for instance, as well as other data that is not executable.

In one embodiment, the management server implements the logical depot node in that the management server provides a repository that stores the self-describing automatic installation package. In this respect, it is said that the logical depot node has one or more filespaces on the management server, where each filespace contains data objects that belong to the logical depot node. Furthermore, there may be more than one logical depot node implemented on the management server in some embodiments of the invention. In this sense, a filespace is a logical construct representing storage space on the management server, where such storage space corresponds to a logical depot node. The filespace is a logical construct in that storage space is not a priori dedicated or allocated to the logical depot node, but rather represents a collection of pointers to data stored on the management server for the logical depot node.

The client computing device has an existing scheduling computer program that is already present on the client computing device, and which periodically runs to perform various tasks on the client computing device. The embodiment of FIG. 1 leverages this existing scheduling computer program. As such, when the existing scheduling computer program is executed in accordance with a previously specified schedule (110), it submits a request to the management server (112) to acquire a list of tasks the client computing device is supposed to perform.

In response to receiving this request (114), the management server, besides indicating what tasks the client computing device is supposed to perform as is conventional, transmits an update computer program to the client node (116). As such, it can be said that the client node downloads the update computer program from the management server (118), during execution of the existing scheduling computer program. The update computer program may be stored on the logical depot node implemented by the management server, or on the management server apart from the logical depot node. It is noted that storage of the update computer program may be on media accessible to the management server, as opposed to just on a storage device that is part of the management server.

As part of part 118, the client node also downloads the self-describing automatic installation package from the logical depot node implemented on the management server. As such, no physical depot node is needed within the computing system as part of the process by which the client node updates itself, which is different than existing updating techniques. The client node and the logical depot node are related to one another. The client node can store files in its own filespace on the management server. Furthermore, because the client node has permission to do so, the client node can download data objects and files from the logical depot node as if the client node had stored these objects and files on the logical depot node.

As such, the client node interacts with the logical depot node by using an interface provided by the management server to access data objects and files stored in the filespace of the logical depot node on the management server. The client node is thus unaware that the logical depot node is indeed logical, and is not a physical depot node. From the point of view of the client node, the logical depot node is no different than a physical depot node, and the client node is unaware that the logical depot node is actually logically implemented on the management server.

In some situations, the client node may not download the correct self-describing automatic installation package from the logical depot node. For example, the package that the client node downloads may be for a different type of operating system than the operating system running on the client node, or for a different version of an operating system as compared to the version of the operating system running on the client node. In such cases, in one embodiment, this mismatch is corrected by the client node downloading the correct self-describing automatic installation package the next time the existing scheduling computer program is scheduled to run.

Execution of the update computer program is spawned on the client node (120) as a child process of the process representing execution of the existing scheduling computer program. This means that the update computer program advantageously and innovatively inherits root access to the client node from the existing scheduling computer program, and advantageously and innovatively inherits security credentials to the management server from the client node. The client node may use either or both of the root access to the client node and the security credentials to the management server to update itself, the latter specifically so that the update status can be reported back to the management server.

The existing scheduling computer program is presumed to have already been configured so that it has root access to the client node and has security credentials to the management server. Such a presumption is acceptable, because for the existing scheduling computer program to report the status of task processing to the management server, it has to have security credentials to present to the management server. Likewise, for the existing scheduling computer program to perform these tasks on the client node, it has to have root access to the client node.

Execution of the update computer program results in the client node updating itself using the self-describing automatic installation package (124). As noted above, the self-describing automatic installation package includes all the information needed for the client node to update itself. In particular, the update computer program may perform the updating process, by unpackaging the self-describing automatic installation package, and causing the executable files within the package to be executed or run in the order indicated by the metadata within the package.

Updating the client node using the self-describing automatic installation package can be performed by the update computer program, because the update computer program has inherited root access to the client node from the existing scheduling computer program. As such, root access to the client node does not have to be otherwise provided to the update computer program for the client node to update itself. No configuration of the update computer program, for instance, has to be performed to manually provide the update computer program with root access to the client node.

It is further noted that the update computer program is downloaded to the client node using an existing scheduling computer program. In this way, the updating process is bootstrapped onto existing code that is already normally executed periodically on the client node—the scheduling computing program. This bootstrapping is advantageous, because it permits the client node to be updated without having to first install the update computer program on the client node manually or by the management server. While manually installing the update computer program on one such client node may not be burdensome, there are typically hundreds, thousands or even hundreds of thousands of such client nodes within a computing system, which would render manual installation of the update computer program on each client node to be very burdensome.

It is also noted that the method 100 is a pull-type process. The client node is updated by the self-describing automatic installation package from the logical depot node. This is as opposed to the logical depot node or the management server pushing the self-describing automatic installation package to the client node. As such, the management server, as well as the logical depot node, does not require root access to the client node for the client node to update itself. The management server, in other words, does not push the self-describing automatic installation package to the client node, but rather the client node pulls the package from the logical depot node implemented on the management server.

Figure 2:
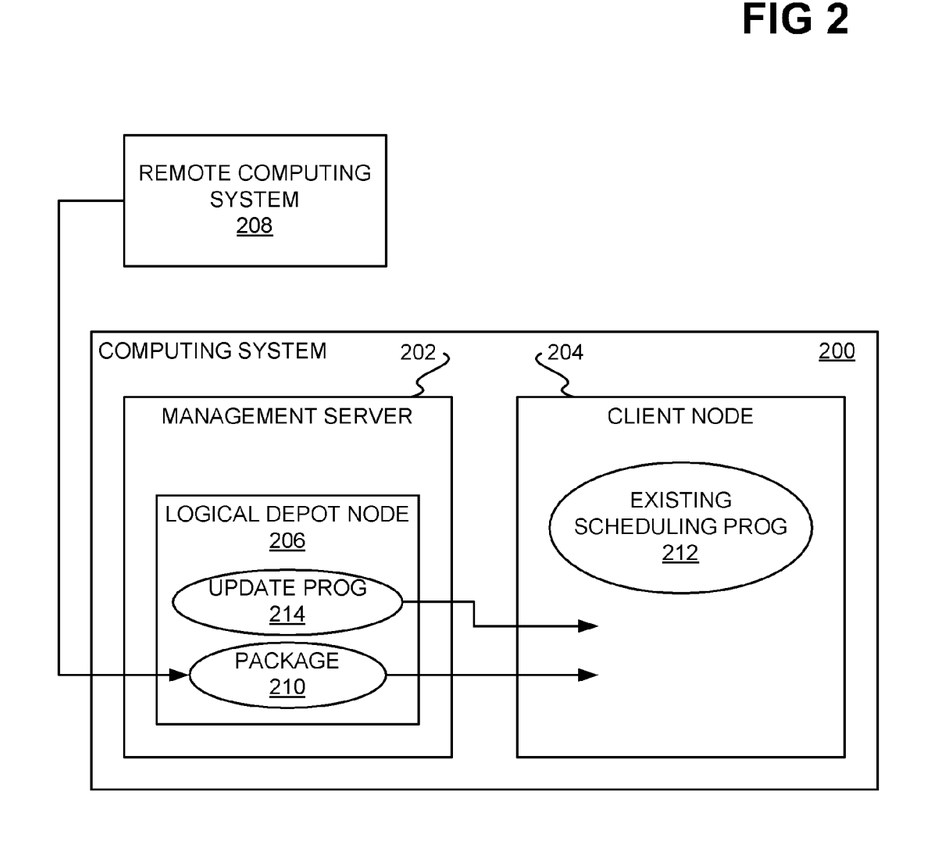
FIG. 2 is a diagram of a computing system including a management server, and a client node that is updated, according to an embodiment of the invention.

FIG. 2 shows a computing system 200 in relation to which the method 100 can be practiced, according to an embodiment of the invention. The computing system 200 includes a management server 202 and a client node 204. The computing system 200 may be a storage system. As such, the management server 202 may be a storage server that provides storage to storage clients. For example, the client node 204 may be such a storage client. It is noted that while just one client node 204 is shown in FIG. 2, in actuality there are many more than just one such node.

The management server 202 implements the logical depot node 206 that has been described. The management server 202 retrieves the self-describing automatic installation package 210 that has been described, from a remote computing system 208 that is different and separate from the computing system 200, and stores the package 210 on the logical depot node 206. The management server 202 also stores the update computer program 214 that has been described, such as on the logical depot node 206.

The client node 204 includes the existing scheduling computer program 212 that has been described. Upon execution of the existing scheduling computer program 212, the client node 204 downloads the update computer program 214, and spawns execution of the update computer program 214 from the existing scheduling computer program 212. The self-describing automatic installation package 210 is further downloaded from the logical depot node 206 implemented on the management server 202 to the client node 204. Using the self-describing automatic installation program 210, the client node 204 updates itself.

Figure 3:
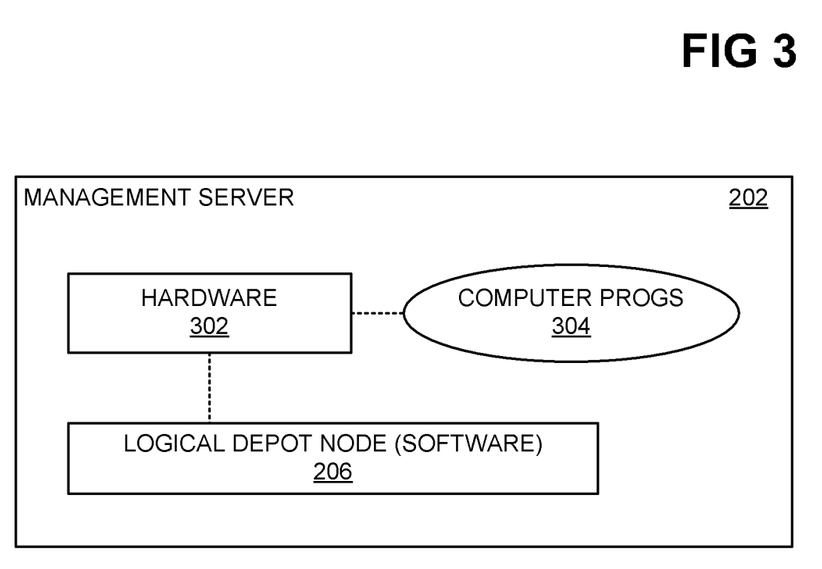
FIG. 3 is a diagram of the management server of FIG. 2 in more detail, according to an embodiment of the present invention.

FIG. 3 shows the management server 202 in more detail, according to an embodiment of the invention. The management server 202 includes hardware 302, one or more computer programs 304, and the logical depot node 206 that the management server 202 implements. The hardware 302 includes one or more processors and memory, and may include other types of hardware as well, such as storage devices, and so on. The logical depot node 206 is implemented as software running on the hardware 302 of the management server 202. For instance, as described above, the logical depot node 206 has one or more filespaces on the management server 202.

The computer programs 304 are executed by the hardware 302, such as by the processors thereof from the memory thereof. Execution of the computer programs 304 results in performance of parts 106, 108, 114, and/or 116 of the method 100 of FIG. 1. For example, the self-describing automatic installation package is copied to the logical depot node 206 from a remote computing system as a result of the computer programs 304 being executed. As another example, in response to the existing scheduling computer program on the client node submitting a request, the update computer program is transmitted to the client node as a result of the computer programs 304 being executed.

The computing system including a client node that has been described is typically a computing system that is present at the location of a customer of a hardware and/or software supplier or vendor, or a service provider. The embodiments of the present invention that have been described therefore permit the customer to more easily update the client nodes of its computing system. However, for such updating to occur, the self-describing automatic installation package first has to be generated. The package is typically generated at a computing system that is remote to the customer's computing system, such as the remote computing system 208 of FIG. 2. For example, the package may be generated at a computing system maintained by the hardware and/or software supplier or vendor, or the service provider. Most generally, the package is said to be generated at a source computing system. Once the package has been generated and appropriately tested, the management server of the customer's computing system copies, or downloads, the package to the logical depot node. The customer's computer system is referred to most generally as a target computing system.

Figure 4:
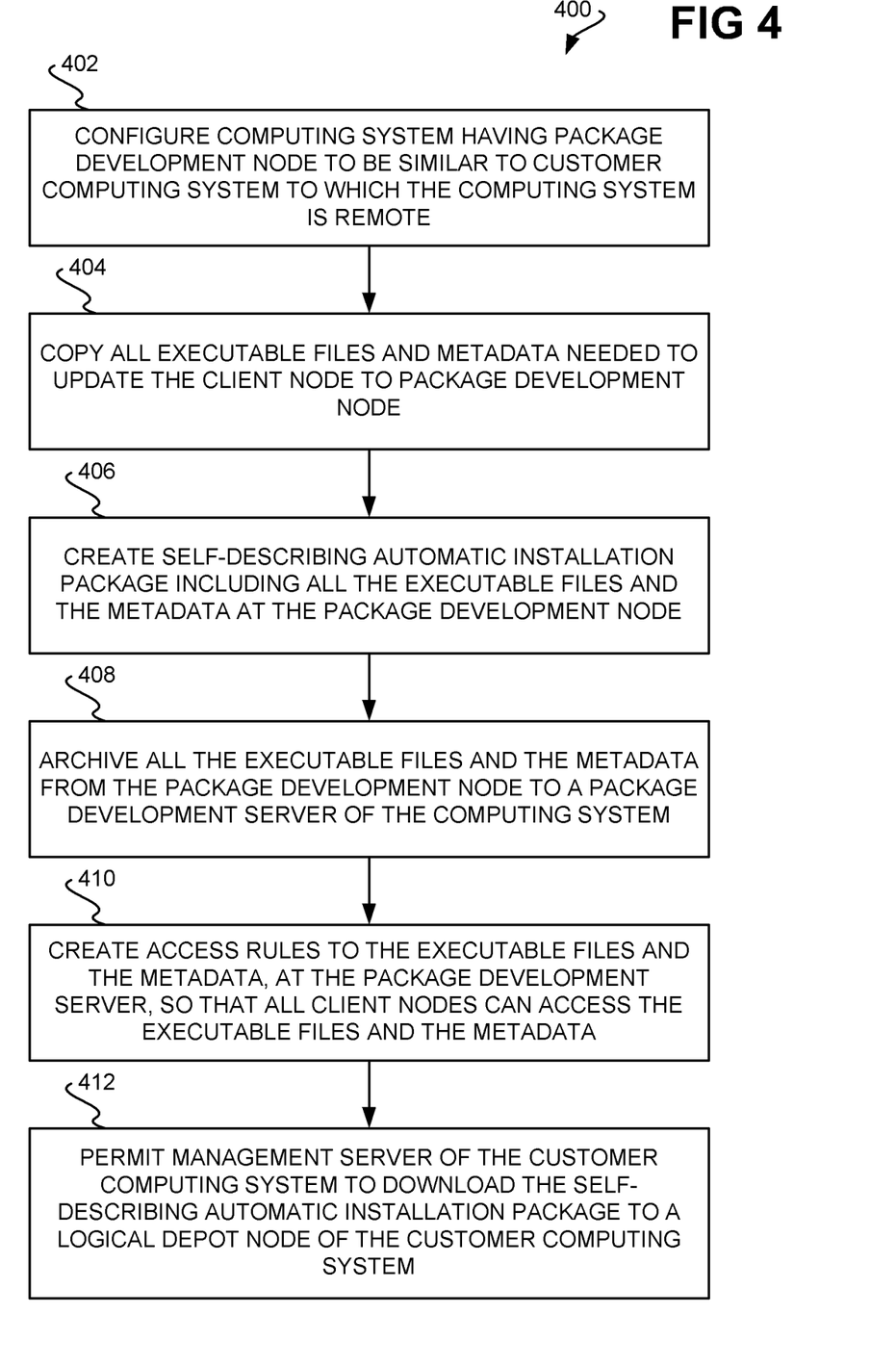
FIG. 4 is a flowchart of a method for generating a self-describing automatic installation package, according to an embodiment of the present invention.

FIG. 4 shows a method 400 for generating a self-describing automatic installation package, according to an embodiment of the invention. A computing system having a client node is configured so that it is similar to the customer computing system to which the computing system is remote (402). This client node is referred to herein as a package development node to distinguish this node from the client node at the customer computing system. The computing system that is configured in part 402 can be the remote computing system 208 of FIG. 2, which is remote to the customer's computing system 200 of FIG. 2. Such configuration results in the package development node of the computing system being similar to the customer's client node, such as the customer's client node 204 of FIG. 2. For example, the package development node may have the same operating system as the customer's client node has. The package development node may also have the same version of the same operating system as the customer's client node has.

The degree of similarity between the package development node and the customer's client node is driven by the updates that are to be installed on the customer's client node. For example, some updates may not be as sensitive to the particular version of a given operating system, such that the package development node and the customer's client node can have different versions of the same operating system. As another example, other updates may have differing degrees of sensitivity to the underlying hardware of a node.

All the executable files and the metadata needed for the customer's client node to update itself are copied to the package development node (404). The self-describing automatic installation package is then created as including all the executable files and the metadata (410), at the package development node. The self-describing automatic installation package is desirably a single file that contains all the executable files and the metadata. Thus, to update the customer's client node, the customer's client node first has to unpackage the executable files and the metadata from the package.

All the executable files and the metadata (i.e., within the self-describing automatic installation package) are then archived from the package development node to a package development server of the computing system that includes the package development node (408). Archival in this respect can mean simply copying the executable files and the metadata from the filespace of the package development node to the filespace of the package development server; that is, the self-describing automatic installation package is copied from the package development node to the package development server. However, archival may be more complicated or different than simply copying the self-describing automatic installation package, and may include performing a backup or archive process of the self-describing automatic installation package.

The process of archiving the executable files and the metadata (within the self-describing automatic installation package) from the filespace of the package development node to the package development server, and the process of creating the self-describing automatic installation package, decouple at least the executable files and the metadata from the package development node. Decoupling in this sense means that another client node, such as the customer's client node, is unable to discern that the executable files and the metadata were originally copied to and were present at the package development node in part 404. This decoupling is advantageous, because it ensures that the customer's client node is subsequently able to download the self-describing automatic installation package from the logical depot node as though it had previously replicated the package to the logical depot node. Furthermore, such decoupling permits multiple client nodes to share the same logical depot node. The customer's client node thus is able to download the executable files and the metadata as part of the self-describing installation package from the logical depot node, even though the executable files and the metadata were indeed originally copied to the filespace of the package development node.

Thereafter, access rules to the executable files and the metadata are created so that all eligible client nodes can access the executable files and the metadata (410). The access rules are created at the package development server to which the self-describing automatic installation package has been archived. Such access rules may be implemented as permission attributes of the executable files and the metadata, for instance, to permit all client nodes to access the executable files and the metadata.

The method 400 concludes by permitting the management server of the customer's computing system to download the self-describing automatic installation package to the logical depot node that the management server implements (412). The package development server may be similar to the customer's management server, in the same way that the package development node is similar to the customer's client node. The package development server exports the executable files, metadata, and self-describing installation package, which were previously archived from the package development node to the package development server, to the customer's management server. As such, the customer's management server is said to import this data from the package development server.

The method 400 is advantageous, at least because it divides the generation of the self-describing automatic installation package from the customer's computing system at which the package will be used, while retaining to some degree the depot node methodology for updating client nodes. That is, conventionally, a physical depot node may be configured by a hardware and/or software supplier, vendor, or service provider, and a self-describing automatic installation package stored on this physical depot node. The physical depot node is then installed at the customer's computing system, for the client nodes thereof to retrieve the package to update themselves.

By comparison, in embodiments of the invention, the hardware and/or software supplier, vendor, or service provider does not configure a physical depot node that is then introduced into the customer's computing system. Rather, the hardware and/or software supplier, vendor, or service provider configures a package development node of its own computing system with all the executable files and metadata needed to update the customer's client node, and archives these files and metadata to the filespace of a package development server of its computing system. The self-describing automatic installation package is created on the package development node using the archived executable files and metadata, then is archived to the package development server, allowing the management server of the customer's computing system to copy this package to a logical depot node implemented on the management server.

As such, the approach that is employed permits a logical depot node to be employed in lieu of a physical depot node, at least in part because the self-describing automatic installation package is decoupled from the filespace of the package development node to which the executable files and the metadata are copied in part 404. If such decoupling were not performed, then the package development node to which the executable files and the metadata are copied in part 404 may instead have to be introduced into the customer's computing system as a physical depot node for successful updating of the client nodes of the customer's computing system.

The inventive approach is advantageous, because it does not require the installation and configuration of a physical depot node at the customer's computing system. Rather, the update process by which the self-describing automatic installation package is introduced into the customer's computing system can be performed completely in an electronic manner. Furthermore, decoupling permits multiple client nodes to share the same logical depot node.

Figure 5:
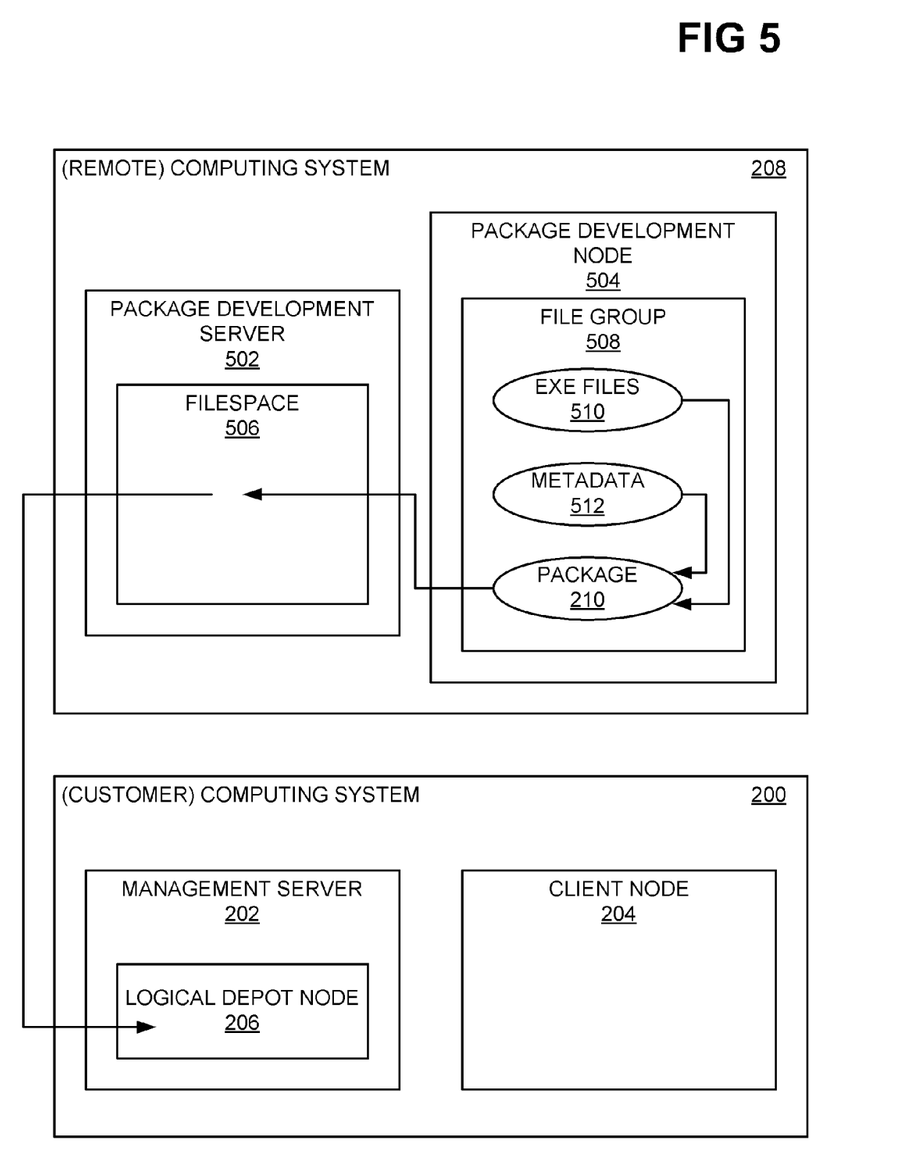
FIG. 5 is a diagram of a computing system in which a self-describing automatic installation package can be generated, and of another computing system to which the package is copied, according to an embodiment of the present invention.

FIG. 5 shows a computing system 208 in relation to which the method 400 can be practiced, according to an embodiment of the invention. The computing system 208 is a computing system that is remote to the customer's computing system 200 of FIG. 2, and which is also shown in FIG. 5. The computing system 208 is located at the hardware and/or software provider, vendor, or service provider that assists the customer with the customer's computing system 200. The customer's computing system 200 includes the management server 202 on which the logical depot node 206 is implemented, and the client node 204, as before.

The computing system 208, by comparison, includes a package development server 502 and a package development node 504. The server 502 may run on the same physical computing device as the package development node 504, or on a separate physical computing device as compared to the package development node 504. The package development server 502 includes a filespace 506 and the package development node 504 includes a file group 508, which also may be a filespace. The package development node 504 is configured so that it is similar to the client node 204, as has been described. All the executable files 510 and the metadata 512 needed for the client node 204 to update itself are copied to the file group 508 of the package development node 504. The self-describing automatic installation package 210 is created on the file group 508 of the package development node 504, as including all the executable files 510 and the metadata 512.

The self-describing automatic installation package 210—including the executable files 510 and the metadata 512—is then archived from the file group 508 of the package development node 504 to the filespace 506 of the package development server 502. Access rules are created, at the package development server 502, to the executable files 510 and the metadata 512 within the self-describing automatic installation package 210 so that all eligible client nodes, such as the client node 204, can access the files 510 and the metadata 512. At this stage, then, the executable files 510 and the metadata 512 have been decoupled from the file group 508 (i.e., such as a filespace) of the package development node 504. The management server 202 is permitted to copy the self-describing automatic installation package 210 to the logical depot node 206, either directly from the package development server 502 of the remote computing system 208, or from an intermediate server, such as a web server, to which the package 210 has been moved. Thereafter, the client node 204 can update itself using the automatic installation package 210, as has been described.

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented on computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented on special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
during execution of an existing scheduling computer program on a client node of a computing system,
downloading an update computer program from a management server of the computing system to the client node;
downloading a self-describing automatic installation package to the client node from a logical depot node of the computing system implemented on the management server, such that no physical depot node is needed within the computing system for the client node to update itself;
spawning execution of the update computer program on the client node from the existing scheduling computer program,
such that the update computer program inherits root access to the client node from the scheduling computer program,
and such that the update computer program inherits security credentials to the management server from the client node; and,
updating the client node using the self-describing automatic installation package, where the self-describing automatic installation package includes all information needed for the client node to update itself.

2. The method of claim 1, wherein the client node interacts with the logical depot node by using an interface provided by the management server, such that the client node is unaware that the logical depot node is logical and not physical.

3. The method of claim 1, wherein the root access to the client node inherited by the update computer program from the existing scheduling computer program is used by the update computer program to update the client node, such that the root access to the client node does not have otherwise to be provided to the update computer program for the client node to update itself.

4. The method of claim 1, wherein the security credentials of the existing scheduling computer program to the management server are used by the update computer program to report a status of updating the client node to the management server, such that no other or separate security credentials are required for the update computer program to report the status of updating the client node to the management server.

5. The method of claim 1, wherein updating the client node using the self-describing automatic installation package is bootstrapped onto the existing scheduling computer program, such that the update computer program does not have to be installed on the client node manually to update the client node.

6. The method of claim 1, wherein updating the client node is performed by pulling the update computer program and the self-describing automatic installation package from the logical depot node as opposed to the logical depot node or the management server pushing the update computer program and the self-describing automatic installation package to the client node, such that the management server does not require the root access to the client node for the client node to update itself.

7. The method of claim 1, wherein the self-describing automatic installation package comprises all executable files and metadata needed for the client node to update itself, wherein access rules govern access to the executable files and the metadata to permit the client node to access the executable files and the metadata.

8. The method of claim 1, wherein the computing system is a storage system, and the client node is a storage client of the storage system.

9. A server computing device comprising:
hardware;
a logical depot node implemented as software running on the hardware such that no physical depot node separate from the logical depot node is needed within a computing system of which the server computing device is a part for a client node of the computing system to update itself; and,
one or more computer programs to copy a self-describing automatic installation package to the logical depot node from a remote computing system that is separate from the computing system,
such that the self-describing automatic installation package includes all information needed for the client node to update itself,
and such that the self-describing automatic installation package is created based on a remote node but is decoupled from the remote node,
wherein the computer program is to, in response to an existing scheduling computer program on the client node being executed and submitting a request, transmit an update computer program and the self-describing automatic installation package to the client node, resulting in the client node updating itself using the self-describing automatic installation package.

10. The server computing device of claim 9, wherein the server computing device provides an interface by which the client node interacts with the logical depot node, such that the client node is unaware that the logical depot node is logical and not physical.

11. The server computing device of claim 9, wherein security credentials to the management server are inherited by the update computer program from an existing scheduling computer program running on the client node, such that no other or separate security credentials are required for the update computer program to report a status of updating the client node to the server computing device.

12. The server computing device of claim 9, wherein the client node updates itself by bootstrapping onto an existing scheduling computer program running on the client node, such that the server computing device does not have to install the update computer program on the client node to update the client node.

13. The server computing device of claim 9, wherein the client node updates itself by pulling the update computer program and the self-describing automatic installation package from the logical depot node, as opposed to the logical depot node or the server computing device pushing the update computer program and the self-describing automatic installation package to the client node, such that the management server does not require the root access to the client node for the client node to update itself.

14. The server computing device of claim 9, wherein the self-describing automatic installation package comprises all executable files and metadata needed for the client node to update itself, wherein access rules govern access to the executable files and the metadata to permit the client node to access the executable files and the metadata.

15. The server computing device of claim 9, wherein the computing system is a storage system, and the client node is a storage client of the storage system.

16. A computer program product comprising:
a data storage device having computer-readable program code embodied therein, the computer-readable program code comprising:
  computer-readable program code to copy all executable files and metadata needed for a client node to update itself to a package development node, the package development node being part of a computing system configured to be similar to a target computing system of which the client node is a part and to which the computing system is remote at least in that the package development node has the same operating system as the client node;
  computer-readable program code to create on the package development node a self-describing automatic installation package including all the executable files and the metadata, such that at least the executable files and the metadata are decoupled from the package development node; and,
  computer-readable program code to archive the executable files and the metadata within the self-describing automatic installation package to a filespace of a package development server of the computing system,
  computer-readable program code to permit a management server of the target computing system to download the self-describing automatic installation package to a logical depot node of the target computing system implemented on the management server, such that no physical depot node is needed within the target computing system for the client node to update itself.

17. The computer program product of claim 16, wherein the computer-readable program code further comprises computer-readable program code to create access rules to the executable files and the metadata within the self-describing automatic installation package on the filespace of the package development server to permit all other client nodes, including the client node of the target computing system, to access the executable files and the metadata.

18. The computer program product of claim 16, wherein the target computing system is a storage system, and the target client node is a storage client of the storage system.

* * * * *